United States Patent [19]
Toyama et al.

[11] Patent Number: 5,333,514
[45] Date of Patent: Aug. 2, 1994

[54] PARALLEL ROBOT

[75] Inventors: Osamu Toyama, Kariya; Masaru Uchiyama, 22-9, 4-chome, Kamo, Izumi-ku, Sendai-shi, Miyagi-ken, both of Japan; Francois Pierrot, 261, rue Ampere A1/N. 5, 34070 Montpellier, France

[73] Assignees: Toyoda Koki Kabushiki Kaisha, Kariya; Masaru Uchiyama, Sendai, both of Japan; Francois Pierrot, Montpellier, France

[21] Appl. No.: 37,594

[22] Filed: Mar. 26, 1993

[30] Foreign Application Priority Data

Apr. 24, 1992 [JP] Japan .............................. 4-027352[U]
Apr. 24, 1992 [JP] Japan .................................. 4-106568

[51] Int. Cl.$^5$ ....................... B25J 17/02; G05G 11/00
[52] U.S. Cl. ..................... 74/479 BW; 74/479 BP; 414/735; 901/23; 901/29; 901/48
[58] Field of Search .................... 74/479 BP, 479 BW; 901/22, 23, 28, 29, 45, 48; 414/735

[56] References Cited

U.S. PATENT DOCUMENTS

| | | | |
|---|---|---|---|
| 4,651,589 | 3/1987 | Lambert | 901/22 X |
| 4,790,718 | 12/1988 | Vickers | 414/735 |
| 4,806,068 | 2/1989 | Kohli et al. | |
| 4,919,382 | 4/1990 | Forman | |
| 4,976,582 | 12/1990 | Clavel | 901/28 X |

FOREIGN PATENT DOCUMENTS

| | | |
|---|---|---|
| 0127895 | 12/1984 | European Pat. Off. |
| 0292056 | 11/1988 | European Pat. Off. |
| 1537663 | 7/1968 | France |
| 2-311284 | 12/1990 | Japan |
| 3-264280 | 11/1991 | Japan |
| WO87/03528 | 6/1987 | PCT Int'l Appl. |
| 1668784 | 8/1991 | U.S.S.R. ............................. 901/28 |

OTHER PUBLICATIONS

IEEE International Conference on Robotics and Automation, Apr. 1991, F. Pierrot, et al., "Towards a Fully-Parallel 6 Dof Robot for High-Speed Applications", pp. 1288-1293.

Journal of Robotics and Mechatronics, vol. 2, No. 4, Aug. 1990, Francois Pierrot, et al., "A New Design of a 6-Dof Parallel Robot", pp. 91-99.

"A Development of Spatial Parallel Manipulators with Six Degrees of Freedom", Hiroaki Funabashi, et al., pp. 303-308, 1990.

Primary Examiner—Allan D. Herrmann
Attorney, Agent, or Firm—Oblon, Spivak, McClelland, Maier & Neustadt

[57] ABSTRACT

A parallel robot comprises a base, three set of arm assemblies disposed on the base at a predetermined spacing, and a bracket member which is supported by the arm assemblies and to which an end effector is attached. Each of the arm assemblies comprises a pair of motors mounted on the base to face each other with a predetermined clearance and a pair of arms which are supported by the motors to be swung, respectively. Each of the arms comprises a first arm portion and a second arm portion. The first arm portion and the second arm portion of each arm are connected with each other through a first joint means, and the second arm portion of each arm is connected with the bracket through a second joint means.

5 Claims, 5 Drawing Sheets

PARALLEL ROBOT

BACKGROUND OF THE INVENTION

1. Field of the Invention

The present invention relates to a parallel robot wherein an end effector is supported by the base of the robot through plural arm assemblies which are arranged in parallel relationship with each other.

2. Discussion of the Prior Art

A parallel robot having a six-degree-of-freedom is disclosed in the Transactions of the Japan Society of Mechanical Engineers, Series C, Vol. 56, No. 523, March 1990. The disclosed parallel robot has six arms each of which is comprised of three links. The three links are connected in series through two joints. The one end of each arm is connected to a base through a joint. Each of these joints is composed of two members constituting a turning pair for rotation about a single axis. Further, the other end of each arm is connected to a bracket through joint means such as a ball joint. Driving motors are disposed on the base to swing the links adjacent to the base. With this configuration, the position and posture of the bracket is controlled.

Such conventional parallel robot has problems as follows. When the parallel robot carries out a movement of six-degree-of-freedom, the links are gradually deformed due to bending moments acting on them, whereby plays are produced. As a result, accuracy of positioning of the bracket of the parallel robot tends to be lowered. Further, because each arm is composed of three links, the entire weight of the parallel robot is relatively heavy, whereby the moving speed of the parallel robot being slow.

SUMMARY OF THE INVENTION

Accordingly, it is an object of the present invention to provide an improved parallel robot in which bending moments do not acts on its arms.

Another object of the present invention is to provide a compact parallel robot with a simple configuration.

Briefly, a parallel robot of the present invention comprises a base, three arm assemblies disposed on the base at a predetermined spacing to surround the center of the base, and a bracket member connected to the three arm assemblies to support an end effector. Each of the arm assemblies is comprised of a pair of motors mounted on the base to face each other with a predetermined clearance, a pair of first arm portions supported by the pair of motors to be swung, and a pair of second arm portions. One ends of the second arm portions are connected to the first arm portions through first joint means and the other ends of the second arm portions are connected to the bracket through second joint means.

With this configuration, both ends of each second arm portion are connected to the bracket and the corresponding first arm portion through two joint means such as the ball joints. Therefore, the deformation of the second arm portions because of bending moments acting on them. Further, the pair of arms of each arm assembly are supported directly by the pair of motors. Therefore, the structure of the robot can be simplified, and be made smaller in size.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

Figure 1:
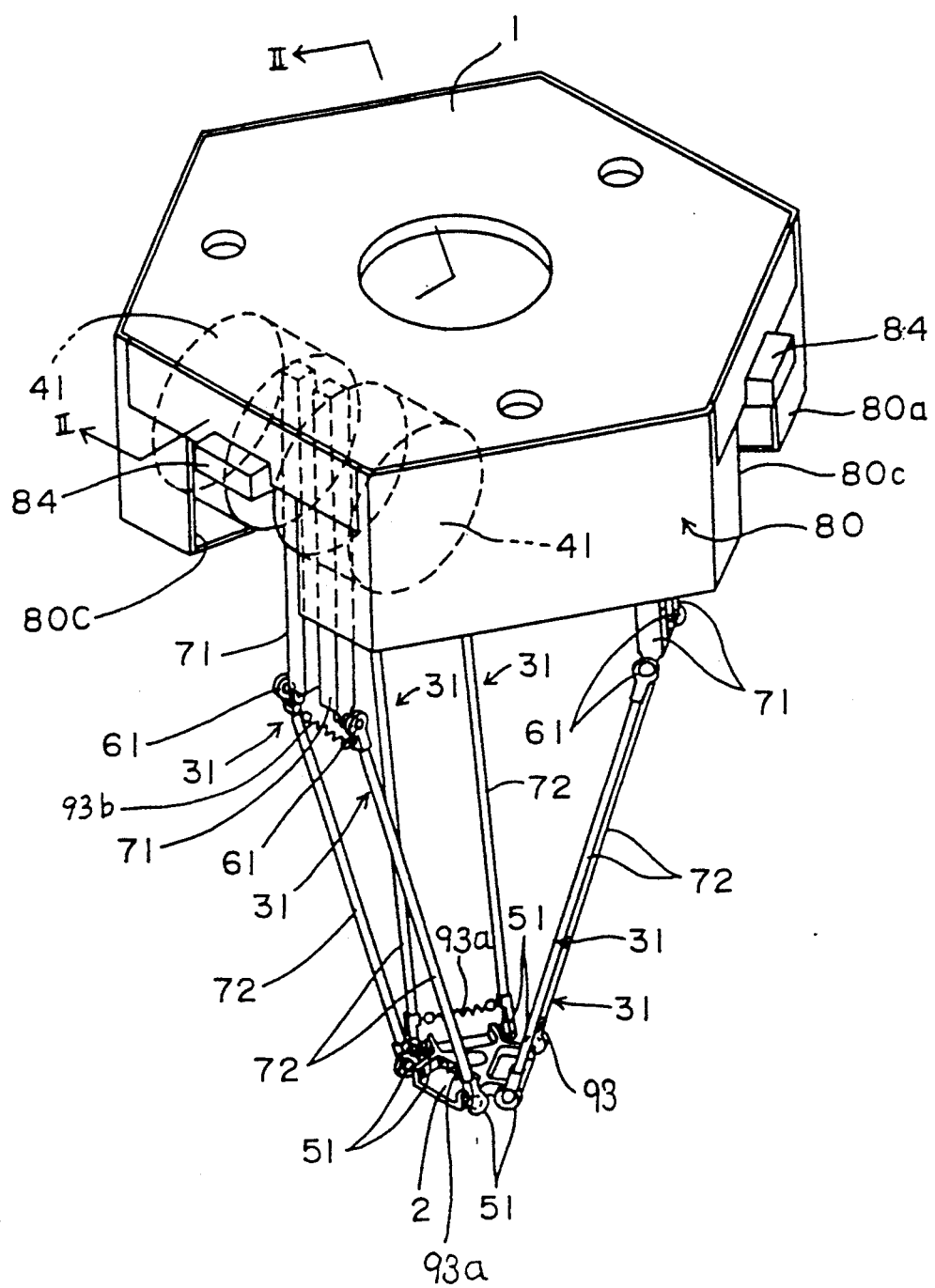
FIG. 1 is a perspective view of a parallel robot according to the present invention.

A preferred embodiment of the present invention will be described hereinafter with reference to drawings.

Referring to FIGS. 1 through 4, a parallel robot of the present invention is mainly composed of a base 1 generally fixed to an outside fixed portion, a protecting cover 80 for covering the base 1, a bracket 2 to which an end effector is to be attached, and six arms 31 which connect the base 1 and the bracket 2.

The base 1 has a hexagonal shape, whereby a hexagonal box-space is formed by the base 1 and the the protecting cover 80. The protecting cover 80 comprises a side protecting cover 80a disposed at the outer periphery of the base 1 and a bottom protecting cover 80b parallel to the base 1. The protecting cover 80 attached to the base 1 with bolts is easily detachable. Further, the protecting cover 80 is provided with three openings 80c for allowing the arms 31 to move without interference from the protecting cover 80. Stoppers 84 are attached to the side protecting cover 80a at locations above the openings 80c as viewed in FIG. 1, while stoppers 83 are attached to the bottom protecting cover 80b at the locations corresponding to the opening 80c. The arms 31 can swing between the stoppers 83 and 84.

In the hexagonal box-space formed by the base 1 and the protecting cover 80, three support brackets 11 are arranged at the positions corresponding to the openings 80c. Each of the support brackets 11 holds two arms 31 which constitute an arm assembly. Therefore, the parallel robot can be divided into three arm assemblies having the same constitution. Hereinafter, only a pair of arms 31 of one arm assembly supported by one of the support brackets 11 will be described.

The support bracket 11 is comprised of two parallel side plates 81 and a back plate 82 connecting the side plates 81. Two motors 41 which drive the pair of arms 31, respectively are supported by the side plates 81 so as to face each other. The side plates 81 and the back plate 82 are perpendicularly fixed to the base 1.

Figure 3:
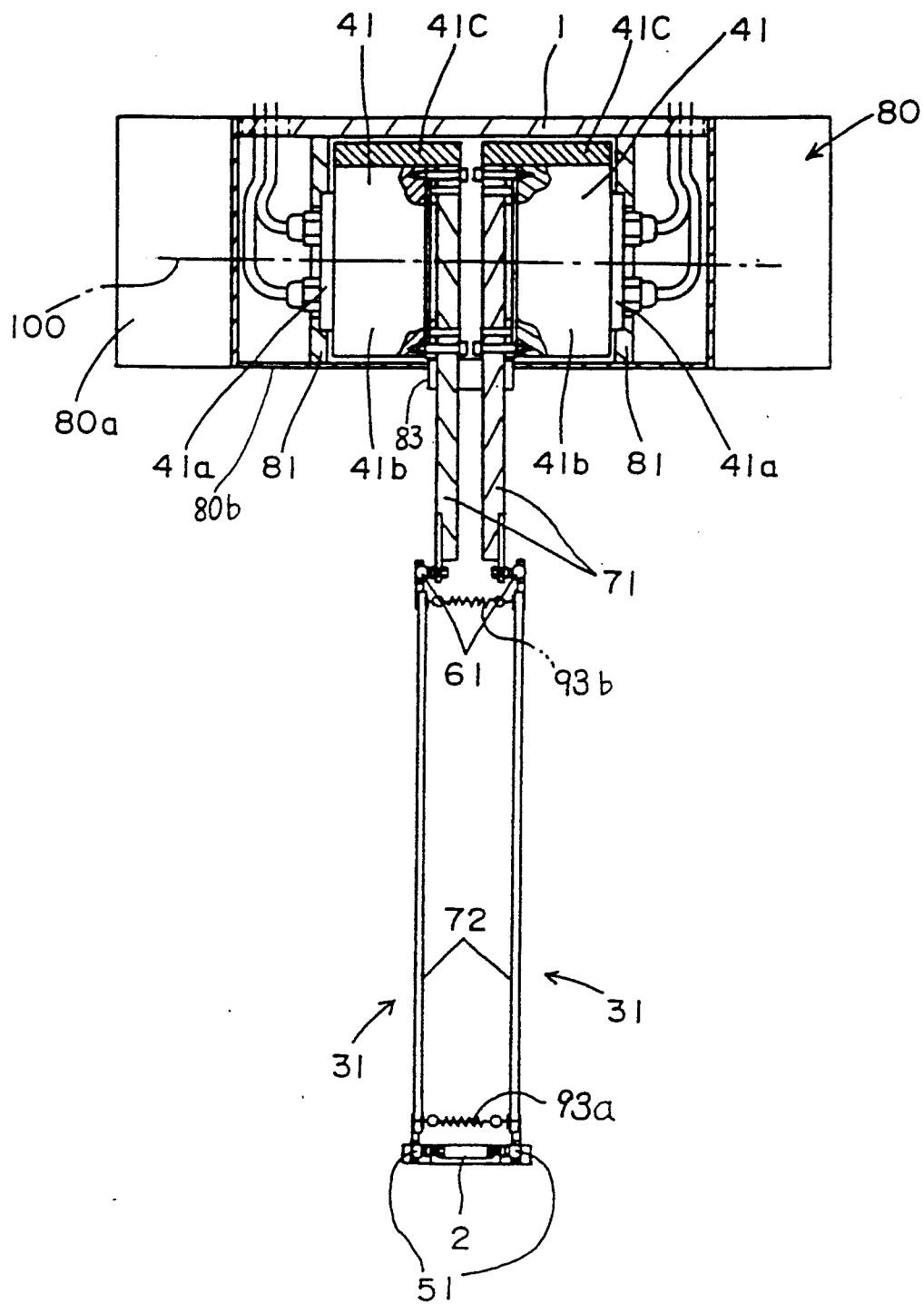
FIG. 3 is a view shown in the direction of the arrow III in FIG. 2.

As illustrated in FIG. 3, each of the motors 41 is comprised of a fixed portion 41a and a cylindrical housing 41b coaxially arranged with respect to the fixed portion 41a. When each of the motors 41 is activated, the housing 41b rotates relatively to the fixed portion 41a. The fixed portions 41a of the motors 41 are fixed to the respective side plates 81 to be aligned with each other on a rotational axis 100. Each of the arms 31 has a first arm portion 71 having a square cross section and a second arm portion 72 having a rodlike shape. The first arm portions 71 of a pair of arms 31 are attached to the inner end surfaces of the cylindrical portions 41b of the motors 41, respectively so as to face each other with a predetermined clearance. The first arm portions 71 rotate about the rotational axis 100 of the motors 41.

Figure 2:
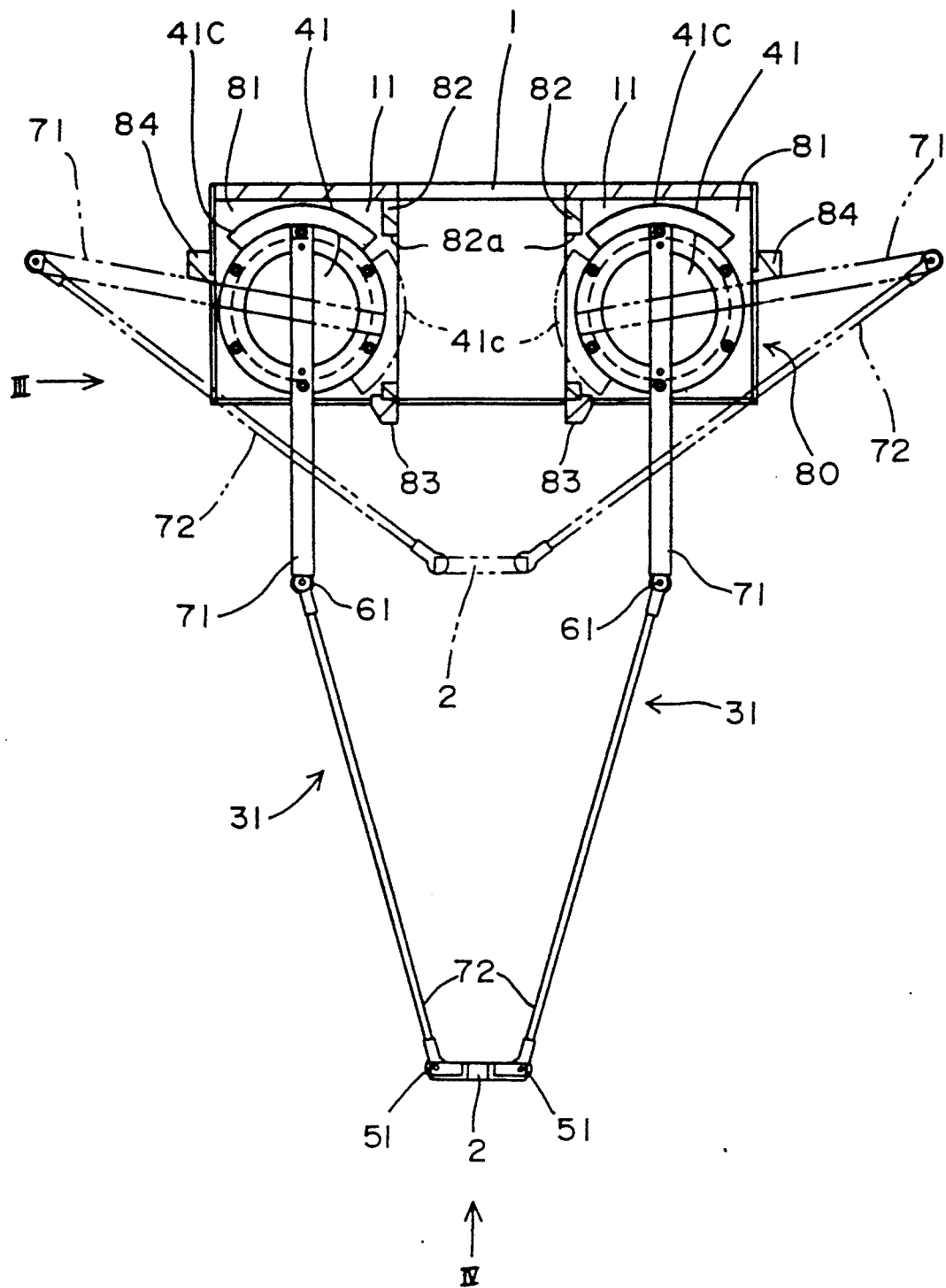
FIG. 2 is a sectional view taken along line II—II in FIG. 1.

A balance weight 41c of a semi-circular shape is mounted on each cylindrical housing 41b at such a location that the balance weight 41c moves above the rotational axis 100 when the corresponding first arm portion 71 is in the vertical posture, as shown in FIG. 2. The back plate 82 is provided with a hole 82a so that the cylindrical housings 41b having the balance weights 41c are allowed to move without interference from the back plate 82 during the swing movements of the first arm portions 71.

The first arm portion 71 of each arm 31 is connected to one end of corresponding second arm portion through first joint means such as a ball joint 61. Each second arm portion 72 is swingable in three-dimensional directions with respect to the corresponding first arm portion 71, with each ball joint 61 acting as a point. The other end of each second arm portion 72 is connected to the bracket 2 through second joint means such as a ball joint 51. With this configuration, each second arm portion 72 is swingable in three-dimensional directions with respect to the bracket 2, with each ball joint 51 acting as a point.

Figure 5:
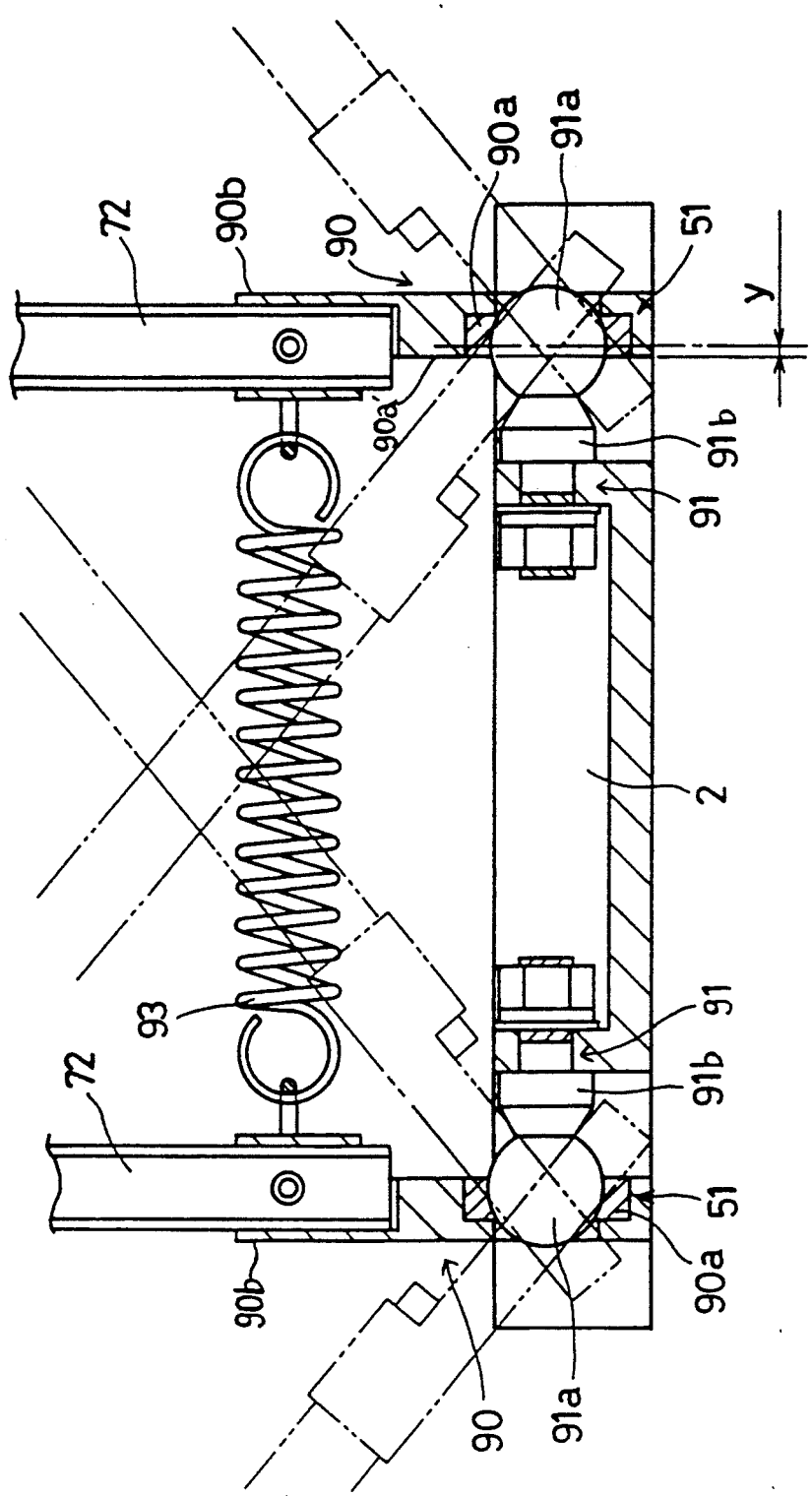
FIG. 5 is an enlarged view of the lower end portion of a pair of arms.

Each of the ball joints 51 comprises a first joint portion 91 having a ball 91a and a bolt 91b, and a second joint portion 90 having a socket 90a and a supporting member 90b. The lower end portions of a pair of arms 31 are illustrated in FIG. 5. The bolt 91b of each first joint portion 91 is fixed to the bracket 2, while the support member 90b of each second joint portion 90 is fixed to the corresponding second arm portion 72. Each socket 90a has a hole extending toward the corresponding bolt 91b such that distance between the center of the ball 91a and the surface 90a' facing the bracket 2 is a predetermined distance y. To enlarge the movable range of the ball joints 51, the distance y is desired to be zero. However, if the distance y is too small, the balls 91a tend to come out of the sockets 90a. Therefore, taking machining error into consideration, it is preferred that the distance y is in a range of 0.5-1 mm. Further, the lower ends of a pair of arms 31, i.e., two second joint portions 90 of the ball joints 51 are connected by elastic means such as a spring 93a, so that the engagement between the first joint portion 91 and the second joint portion 90 is always maintained. The ball joints 61 between the first arm portions 71 and the second arm portions 72 have the same structure as that of the ball joints 51. The ends of a pair of second arm portions 72, i.e., two second joint portions 90 of the ball joints 61 are also connected with a spring 93b, as shown in FIG. 3.

When a controller (not shown) outputs command signals to the six motors 41, respectively, the six first arm portions 71 supported by the motors 41 swing about their respective rotational axis 100. The swing movements of six first arm portions 71 are combined so that the second arm portions 72 connected to the ends of the first arm portions 71 are swingable in three-dimensional directions. As a result, positioning of the bracket 2 is carried out by three arms 31 each of which is one of the arms 31 which are supported by each support bracket 11. The other three arms determine the posture of the bracket 2. In this way, the parallel robot of the present invention controls the bracket 2 in six-degree-of-freedom, that is in its position and attitude, by the swing movements of the arms 31.

As described above, in the parallel robot of the present invention, each arm 31 is comprised of the first arm portion 71 and the second arm portion 72. The first arm portion 71 and the second arm portion 72 of each arm 31 are connected to each other by a first joint means such as a ball joint 61. Thus, the movement of six-degree-of freedom is made by fewer elements compared with the conventional parallel robot, whereby it is possible to decrease the weight of the parallel robot and move the arms at a higher speed. The ends of each second arm portion 72 are connected to the bracket 2 and the corresponding first arm portion 71 through the joint means such as the ball joints 51 and 61, respectively. Therefore, the deformation of the second arm portions 72 because of bending moments acting on them is prevented which would otherwise produce plays.

Figure 4:
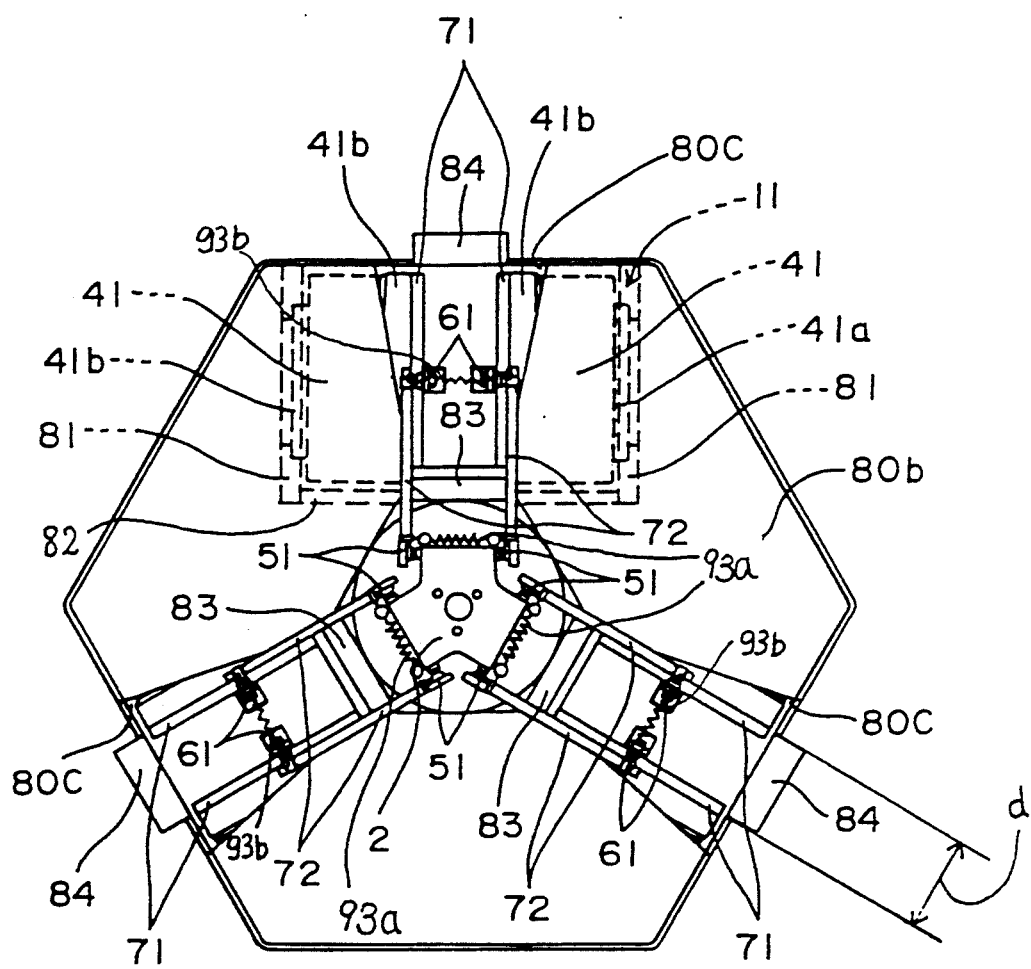
FIG. 4 is a view shown in the direction of the arrow IV in FIG. 2.

Two motors 41 are fixed to the side plates 81 of each support bracket 11 so as to face each other. Each of the motors 41 directly supports the first arm portion 71 at its inner end. With this constitution, space d between a pair of arms 31 can be decreased, as shown in FIG. 4, so that the bracket 2 can be made smaller. As a result, it is possible to make the parallel robot more compact and increase its kinetic performance. In addition, since the motors 41 are exposed when the protecting cover 80 is removed, the maintenance of the motors 41 can be performed easily.

Further, because the balance weight 41c of a semi-circular shape is mounted on each motor 41, unbalanced load which acts on each motor 41 due to the existence of the bracket 2 and the corresponding arm 31 is offset. Therefore, it is possible to move the arms 31 smoothly. Further, this mechanism for cancelling the unbalanced load requires small space.

Furthermore, at each ball joint 51, the distance y between the center of the ball 91a and the surface 90a' facing the bracket 2 is set to be close to 0. Consequently, the working area of the arms 31 can be expanded. Since the ball joints 51 of a pair of arms 31 are also connected with a spring 93, the spring 93 prevent the balls 91a of the ball joints 51 from coming out of the sockets 90a even when the motion of the arms covers a large area.

Incidentally, if the distance y is too large to hold the ball 91a in each ball joint 51 and 61, the spring 93a and 93b can be omitted. Also, though the ball joints are used as the first and second joint means, universal joints may be used instead of the ball joints 51 and 61. In such case, the spring 93a and 93b can be omitted.

Obviously, numerous modifications and variations of the present invention are possible in light of the above teachings. It is therefore to be understood that within the scope of the appended claims, the present invention may be practiced otherwise than as specifically described herein.

What is claimed is:

1. A parallel robot comprising:
a base;
three arm assemblies disposed on said base at a predetermined spacing to surround the center of said base; and
a bracket member connected to said three arm assemblies to support an end effector, wherein
each of said arm assemblies comprises:
a pair of motors mounted on said base to face each other with a predetermined clearance;
a pair of first arm portions supported by said pair of motors to be swung; and a pair of second arm portions, one ends of said second arm portions being connected with said first arm portions through first joint means and the other ends of said second arm portions being connected to said bracket through second joint means.

2. A parallel robot as set forth in claim 1, wherein:
each of said motors comprises a fixed portion and a cylindrical portion coaxially arranged with said fixed portion for rotation about said fixed portion, said fixed portion of each motor is fixed to said base, and each of said first arm portions is attached to said cylindrical portion of each motor.

3. A parallel robot as set forth in claim 2, wherein:
a balance weight of a semi-circular shape is mounted on said cylindrical portion of each motor.

4. A parallel robot as set forth in claim 1, wherein:
said first joint means and/or said second joint means are ball joints, each of said ball joints having a ball portion and a socket portion covering said ball portion.

5. A parallel robot as set forth in claim 4, wherein:
said socket portion of each ball joint is shaped to cover about the halve of each ball portion, and wherein
said ball joints are assembled in each arm assembly as said first joint means and/or second joint means in such a way that engagements between said socket portions and said ball portions are maintained with elastic means which is disposed between said pair of second arm portions.

* * * * *